United States Patent [19]
Goto

[11] Patent Number: 5,212,514
[45] Date of Patent: May 18, 1993

[54] CAMERA HAVING A FOCUS DETECTING OPTICAL SYSTEM

[75] Inventor: Hisashi Goto, Musashino, Japan

[73] Assignee: Olympus Optical Co., Ltd., Tokyo, Japan

[21] Appl. No.: 745,757

[22] Filed: Aug. 16, 1991

[30] Foreign Application Priority Data

Aug. 17, 1990 [JP] Japan .................. 2-216654

[51] Int. Cl.$^5$ .................. G03B 13/36; G03B 19/12
[52] U.S. Cl. .................. 354/402; 354/479
[58] Field of Search .................. 354/402, 406, 407, 408, 354/479, 152, 154

[56] References Cited

U.S. PATENT DOCUMENTS

| | | | |
|---|---|---|---|
| 3,601,027 | 8/1967 | Ono | 354/479 |
| 3,860,935 | 1/1975 | Stauffer | 354/407 |
| 4,941,010 | 7/1990 | Aihara et al. | 354/407 |
| 4,978,988 | 12/1990 | Karasaki | 354/406 |

FOREIGN PATENT DOCUMENTS 63-131111 6/1988 Japan .
46509 1/1992 Japan .

Primary Examiner—W. B. Perkey
Attorney, Agent, or Firm—Cushman, Darby & Cushman

[57] ABSTRACT

A camera includes a swing-up type instant-return mirror composed of a half mirror and a reflecting member located directly before a photographic plane when the instant-return mirror is placed on the optical path of a photographic lens and removed from the optical path when the instant-return mirror is removed from the optical path, in which when the instant-return mirror is placed on the optical path of the photographic lens, part of beams of light from the photographic lens is reflected from the instant-return mirror and incident on a finder optical system and the remainder is transmitted through the instant-return mirror, reflected in turn from the reflecting member and the instant-return mirror, and incident on a focus detecting optical system. Thus, the camera has practically important advantages of being provided with a focus detecting apparatus in which focusing can be made at any position of the focus detector assemblies extending in the directions of the major and minor sides of the picture plane to be photographed and at the same time, of being compactly designed.

5 Claims, 5 Drawing Sheets

CAMERA HAVING A FOCUS DETECTING OPTICAL SYSTEM

BACKGROUND OF THE INVENTION a) Field of the Invention

This invention relates to a camera, and more particularly to a single-lens reflex camera.

b) Description of the Related Art

In the past, what is called a TTL system which is free of parallax has been adopted as a focus detecting apparatus for single-lens reflex camera.

An example of the conventional focus detecting apparatus of this type is schematically shown in FIG. 1 with reference to the optical system of the apparatus which is incorporated in the single-lens reflex camera and commercially available. This optical system comprises a photographic lens 1; a swing-up type instant-return mirror 3 composed of a half mirror, pivotally mounted in the mirror box 2; a sub-mirror 4 pivotally mounted at a point Q on the back surface of the instant-return mirror 3, located perpendicular to the instant-return mirror 3 when the instant-return mirror 3 is set at its lower position (shown) and coming in close contact with the back surface of the instant-return mirror 3 when the instant-return mirror 3 is shifted to the upper position; a film plane 5 arranged, behind the sub-mirror 4, on the rear face of the mirror box 2; a field stop 6 arranged, on the optical path of reflection from the sub-mirror 4, at a plane equivalent optically to the film plane 5; a condenser lens 7 arranged adjacent to the field stop 6; a mirror 8 arranged behind the condenser lens 7; an separator stop 9 arranged behind the mirror 8, having a pair of apertures juxtaposed normal to the plane of the figure at an interval which makes it possible to secure focusing accuracy; a pair of separator lenses (reimaging lenses) 10 juxtaposed, normal to the plane of the figure, behind the pair of apertures of the separator stop 9, respectively; a light-receiving element 11 arranged at the imaging position brought about by the separator lenses 10; a focusing screen 12 arranged, on the optical path of reflection from the instant-return mirror 3, at a plane equivalent optically to the film plane 5; a condenser lens 13 disposed in front of the focusing screen 12; a field stop 14 disposed at the same position as the focusing screen 12; a pentagonal prism 15 whose entrance surface is positioned in rear of the focusing screen 12; and an eyepiece 16 arranged behind the exit surface of the pentagonal prism 15. Of these components, the photographic lens 1 and film plane 5 constitute a photographing optical system. Further, the instant-return mirror 3, sub-mirror 4, field stop 6, condenser lens 7, mirror 8, separator stop 9 with a pair of apertures, separator lenses 10 in a pair, and light-receiving element 11 constitute a focus detecting optical system on a phase correlation scheme of performing the focus detection by making use of beams of light traversing the different areas of the photographic lens 1 to detect the relative positional relationship of a pair of images of an object. Also, the instant-return mirror 3, condenser lens 13, focusing screen 12, field stop 14, pentagonal prism 15, and eye-piece 16 constitute a finder optical system.

Specifically, when the instant-return mirror 3 is set at its upper position, a primary image $I_0$ of an object point 0 is formed on the film plane 5 by the photographic lens 1. On the other hand, when the instant-return mirror 3 is set at its lower position, part of the imaging beams of light through the photographic lens 1 is transmitted by the instant-return mirror 3 and conducted to the focus detecting optical system and the remainder, reflected from the instant-return mirror 3, is conducted to the finder optical system.

For the focus detecting optical system, the light beam transmitted through the instant-return mirror 3 is reflected at the sub-mirror 4 so that a primary image $I_1$ of the object point 0 is formed on the field stop 6 and then, through the condenser lens 7, mirror 8, separator stop 9 with a pair of apertures, and separator lens 10 in a pair, a pair of secondary images $I_2$ and $I_3$ is formed on the light-receiving element 11.

As for the finder optical system, the light beam reflected from the instant-return mirror 3 is nearly collected by the condenser lens 13 so that a primary image $I_1'$, after being formed on the focusing screen 12, is converted into an orthographic image, together with the image of the field stop 14, by the pentagonal prism 15, the orthographic image being magnified through the eyepiece 16 for observation at an eyepoint EP.

In the focus detecting optical system, the image of an exit pupil P at the photographic lens 1 is formed on the separator stop 9 by virtue of the condenser lens 7. By the pair of apertures of the separator stop 9 and the pair of separator lenses 10, two beams of light traversing the different areas of the exit pupil P are conducted onto the light-receiving element 11 while holding a certain base length (the distance between the light beams passing through the centers of the apertures of the separator stop 9).

Also, there is a demand for the focus detecting apparatus in which the focus detection can be performed with respect to the periphery of a picture plane to be photographed as well as the center thereof. Such focus detecting apparatus are set forth, for example, in Japanese Patent Preliminary Publication No. Sho 63-131111 and Japanese Patent Preliminary Publication No. Hei 4-6509 proposed by the same applicant as in this application. The former is adapted to comprise discretely a plurality of focus detector assemblies in the direction of a major side perpendicular to the optical axis (principal optical axis) of the photographic lens 1. The latter, on the other hand, is such that focusing can be made at any position of the focus detector assemblies extending in the directions of major and minor sides of the picture plane to be photographed. FIG. 2 is a diagram showing an essential part of the optical system of the latter. This figure shows only an imaging optical system subsequent to the field stop of the focus detecting optical system. The imaging optical system includes a field stop 17 in which a wide field of view is set, having an aperture 17a (for example, of a rectangle); a condenser lens 18 performing principally the transfer of a pupil image; an aperture stop 19 having a pair of apertures 19a and 19b deviated, by δ, from the principal optical axis of the condenser lens 18; and a first separator lens 20 and a second separator lens 21 which have positive refracting powers. Of the entrance surfaces of these two separator lenses 20 and 21, at least one is configured as an aspherical surface. In such an instance, the condenser lens may be a two-lens unit consisting of lenses 22 and 23 as depicted in FIG. 3 and each of the separator lenses 20 and 21 may be separately constructed on both sides of the principal optical axis as shown in FIG. 4. By this arrangement, the light beams passing through the different areas of the exit pupil P of the photographic lens 1 are formed as the primary image with the wide field of view at the field stop 17 so that the primary image, after being somewhat magnified by the condenser lens 18, passes through the pair of the apertures 19a and 19b of the aperture stop 19, is relayed by the first and second separator lenses 20 and 21 and formed as two secondary images with parallax which are inverted real images, on the sensor surface of the light-receiving element 11. Such an arrangement makes it possible to perform focusing at any position of the focus detector assemblies extending in the directions of the major and minor sides of the picture plane, but a primary imaging plane needs to extend in the directions of the major and minor sides as a matter of course. As shown in FIG. 1, however, in the case where the optical system includes the swing-up type instant-return mirror 3 composed of a half mirror, pivotally mounted in the mirror box 2 and the sub-mirror 4 pivotally mounted on the back surface of the instant-return mirror 3, located perpendicular to the instant-return mirror 3 when the instant-return mirror 3 is set at the lower position and coming in close contact with the back surface of the instant-return mirror 3 when the instant-return mirror 3 is in the upper position, the sub-mirror 4 must be enlarged to expand the primary imaging plane, so that the mirror box 2 becomes imperatively large and the camera body also increases in size, with unfavorable results. Moreover, it is required that the back focus of the photographic lens is increased, which imposes great restrictions on the design of the photographic lens, also with unfavorable results.

To prevent the mirror box 2 from being enlarged, Hei 2-108195 proposes an arrangement such as shown in FIG. 5 by way of example. Specifically, a condenser lens 24 and a half mirror 25 are arranged on the optical path of reflection from the instant-return mirror 3 constructed of an ordinary reflecting member, and the aperture stop 19 with a pair of apertures, a pair of separator lens units 26 composed of the first and second separator lenses 20 and 21, and the light-receiving element 11 are arranged, in the order described on the optical path of reflection from the half mirror 25 to constitute the focus detecting optical system. Further, a mirror 27 is arranged on the optical path of transmission through the half mirror 25, and an aperture stop 28, a field transfer lens 29, a pupil transfer lens 30, and the eyepiece 16 are arranged on the optical path of reflection from the mirror 27 to constitute the finder optical system.

For the field image transfer, in the finder optical system, the field image $I_1$ formed on the condenser lens 24 by the photographic lens 1 is further formed adjacent to the pupil transfer lens 30 as the image $I_2$ erected by the half mirror 25, mirror 27, and field transfer lens 29, and the image $I_2$ is magnified and observed as an orthographic virtual image through the eyepiece 16. In the finder optical system, on the other hand, the field image $I_1$ is formed, as two images $I_3$ and $I_4$ with paralax, on the light-receiving element 11 by the half mirror 25 and the separator lens units 26. In such a case, to form the two images $I_3$ and $I_4$ with parallax, a diffuser, a split image prism, or a microprism cannot be disposed in the area of the field image $I_1$. Focusing through the eye can be made by providing the diffuser, split image prism, or microprism in the area of the image $I_2$ erected by the field transfer lens 29.

As for the pupil image transfer, in the finder optical system, the image of the exit pupil P at the photographic lens 1 is transferred through the instant-return mirror 3, condenser lens 24, half mirror 25, and mirror 27 onto the aperture stop 28 and then, through the field transfer lens 29, pupil transfer lens 30, and eyepiece 16 to the eyepoint EP. In the focus detecting optical system, on the other hand, the image of the exit pupil P is transferred through the instant-return mirror 3, condenser lens 24, and half mirror 25 onto the aperture stop 19.

According to the foregoing arrangement, the half mirror 25 splitting the light beam directed toward the finder optical system in the direction of the focus detecting optical system is arranged in rear of the instant-return mirror 3 directing the light beam from the photographic lens 1 toward either the film plane 5 or the finder optical system, so that the mirror box 2 dispenses with the need for the sub-mirror 4 pivotally mounted on the back surface of the instant-return mirror 3 and can be constructed without any increase in size.

The use of such an arrangement certainly makes it possible to perform focusing at any position of the focus detector assemblies extending in the directions of the major and minor sides of the picture plane and prevents the mirror box 2 from increasing in size. This arrangement, however, has encountered the problems that the optical path length cannot be secured for using the pentagonal prism in the finder optical system like the conventional manner and the volume occupied by the finder and focus detecting optical systems increases, with the result that the entire camera body becomes bulky.

SUMMARY OF THE INVENTION

It is, therefore, an object of the present invention to provide a camera which is equipped with a focus detecting apparatus in which focusing can be made at any position of the focus detector assemblies extending in the directions of the major and minor sides of the picture plane to be photographed and which at the same time, can be designed compactly.

This object is accomplished, according to the present invention, by providing a swing-up type instant-return mirror composed of a half mirror, pivotally mounted in a mirror box and a reflecting member mounted in the mirror box, located directly before a photographic plane when the instant-return mirror is placed on the optical path of a photographic lens and removed from the optical path when the instant-return mirror is removed from the optical path, in which when the instant-return mirror is placed on the optical path of the photographic lens, part of beams of light from the photographic lens is reflected from the instant-return mirror and incident on a finder optical system, while the remainder is transmitted through the instant-return mirror and reflected from the reflecting member followed by the instant-return mirror to enter a focus detecting optical system.

According to the preceding arrangement, in the finder optical system, a primary imaging plane is independent of the focus detecting optical system, so that a diffuser, a split image prism, or a microprism can be disposed at the primary imaging plane and focusing through the eye can be performed without providing a secondary imaging plane. Additionally, the pentagonal prism like the conventional manner can be employed, with the resultant compaction of the finder optical system.

In the focus detecting optical system, on the other hand, the primary imaging plane is disposed adjacent to the photographic plane in the mirror box, so that even though the focus detector assemblies of the picture plane extend in the directions of its major and minor sides, the mirror box does away with the need for an increase in size. Further, since the optical path of the focus detecting optical system is bent by the instant-return mirror, the mirror box can be constructed without an increase in size. Besides, the mirror box contains a condenser lens which had been placed previously outside the mirror box and an optical path from the condenser lens to an aperture stop of the focus detecting optical system, with the result that the volume required can be diminished only by the focus detecting optical system.

Also, the reflecting member way well be replaced with a positive lens or a concave mirror.

This and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 1:
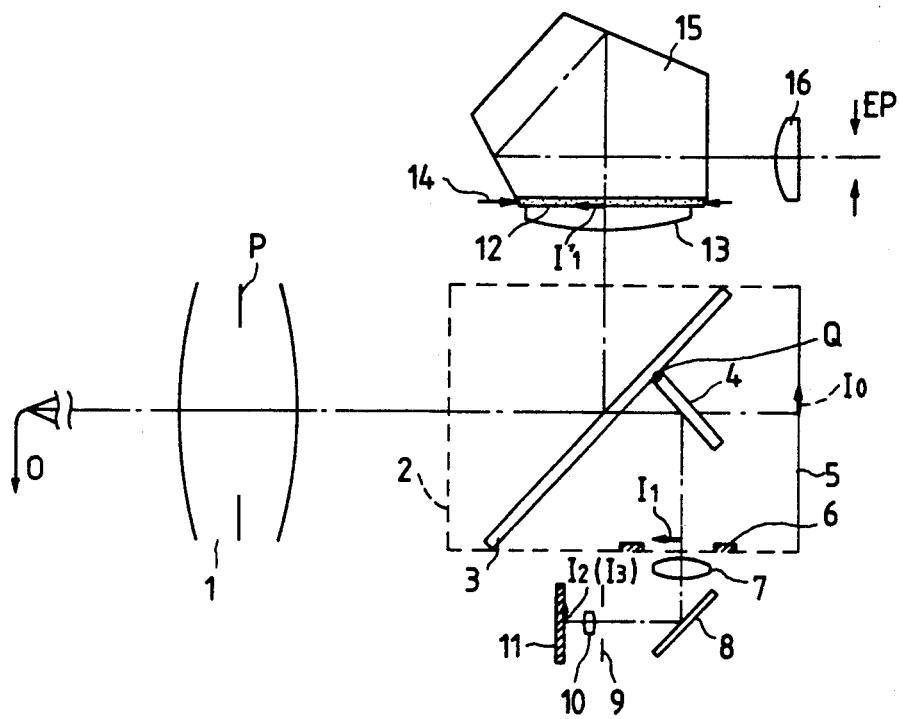
FIG. 1 is a view showing the optical system of one example of conventional cameras.
Figure 2:
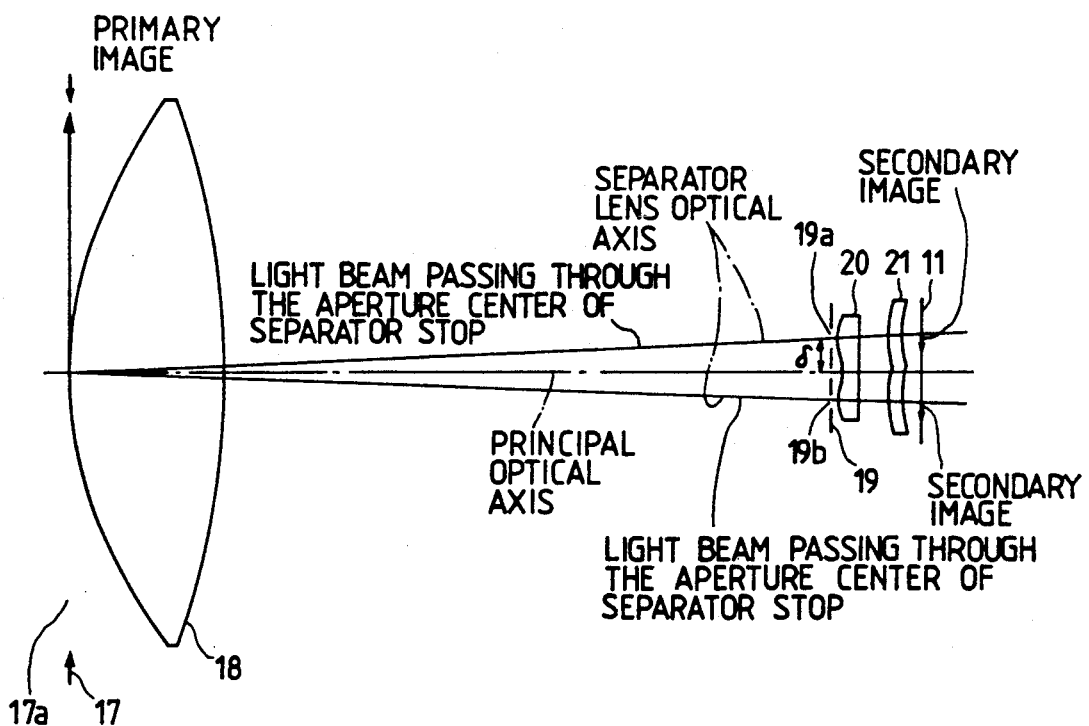
FIG. 2 is a view showing an essential part of the optical system of another example.
Figure 3:
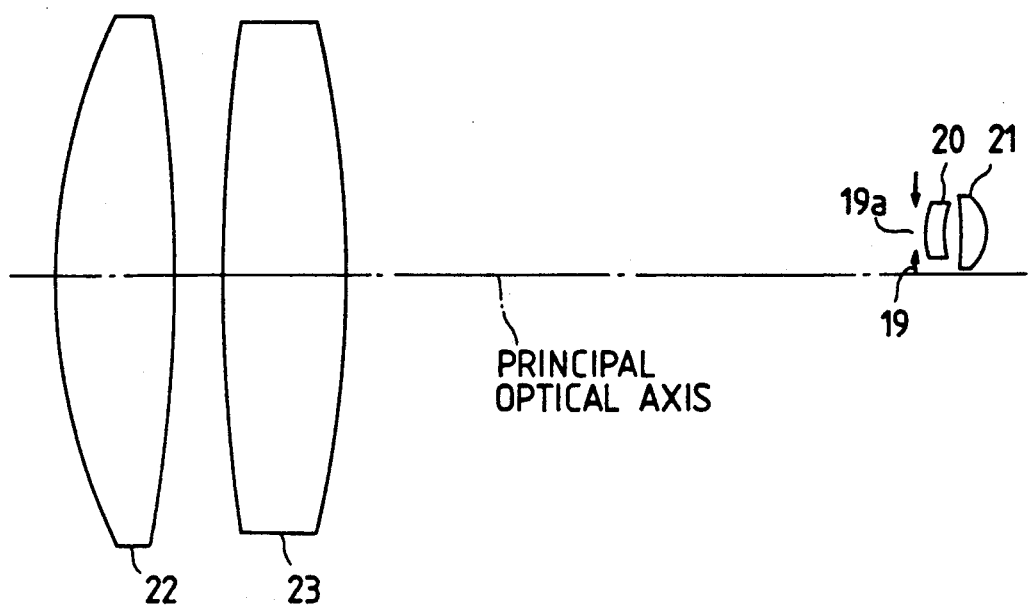
FIGS. 3 and 4 are views showing essential parts of the optical systems of modifications of the example given in FIG. 2.
Figure 4:
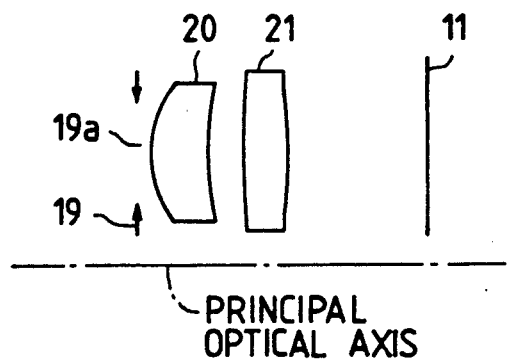
Figure 5:
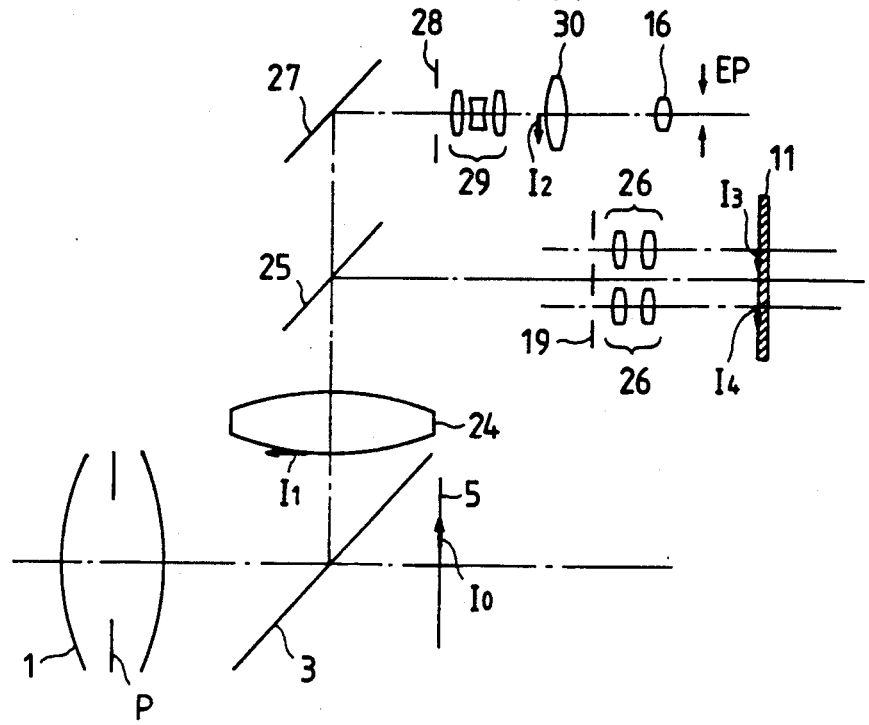
FIG. 5 is a view showing the optical system of still another example.

In accordance with the embodiments shown in the drawings in which like numerals and symbols are used for like members with the prior art, the present invention will be explained in detail below.

Figure 6:
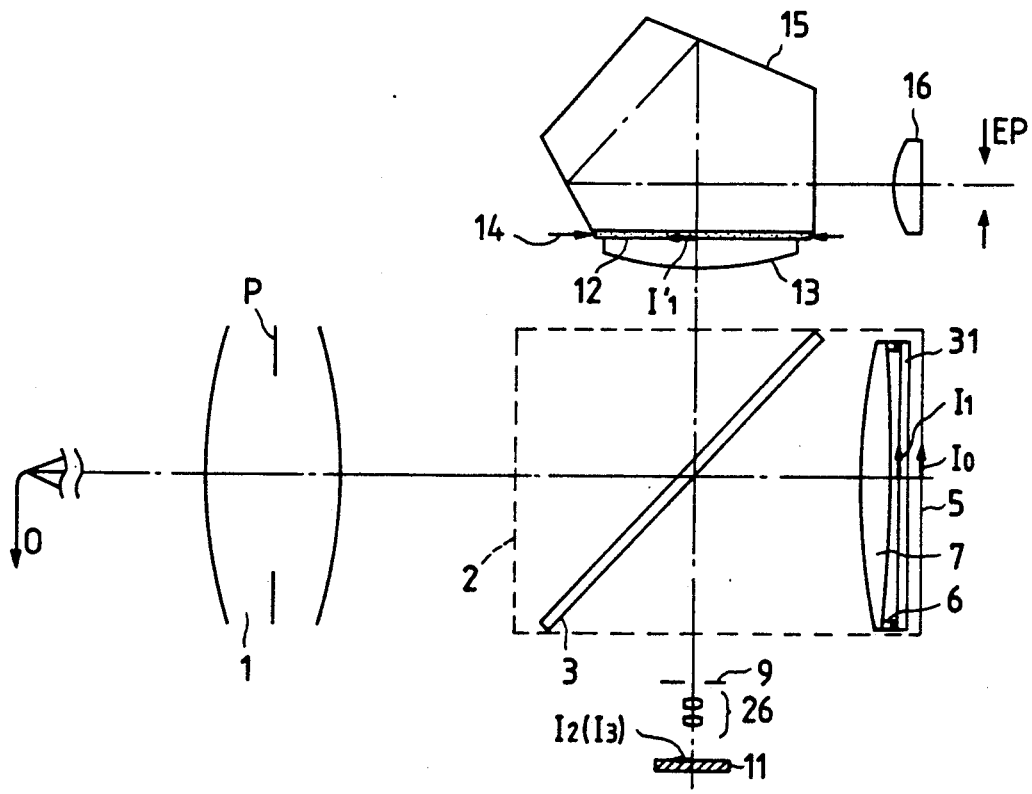
FIG. 6 is a view showing the optical system of a first embodiment of a camera according to the present invention.
Figure 7:
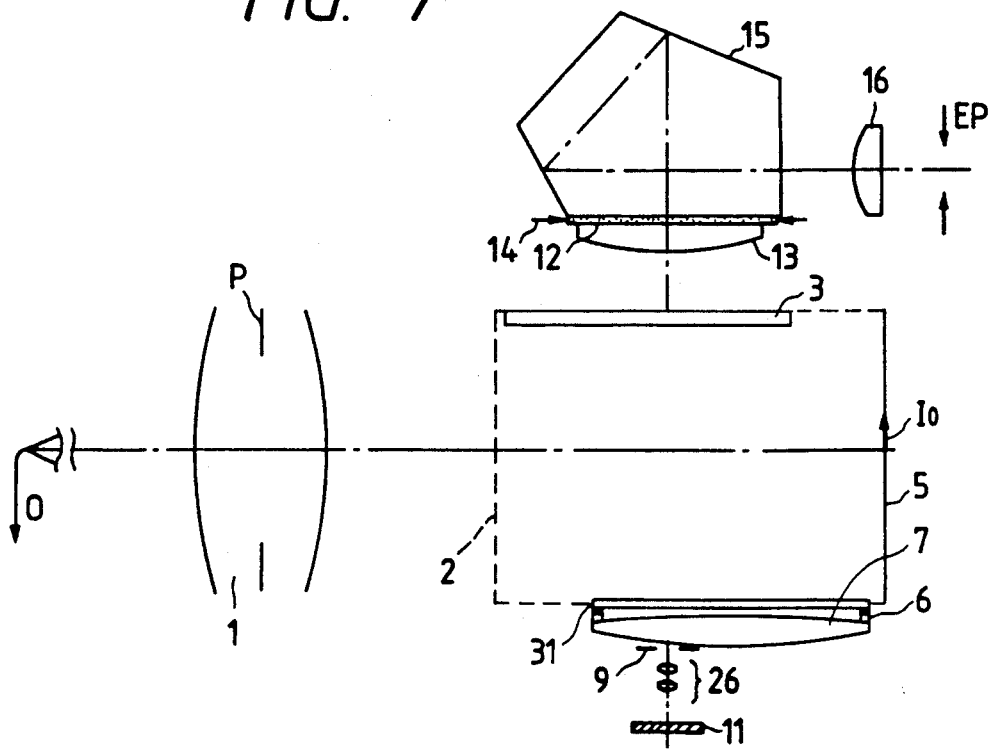
FIG. 7 is a view showing the state where an instant-return mirror and others are removed from the optical path of a photographic lens on photographing in the first embodiment.

FIG. 6 shows the optical system of a first embodiment of a camera according to the present invention. This optical system comprises the photographic lens 1; the swing-up type instant-return mirror 3 composed of a half mirror, pivotally mounted in the mirror box 2; a reflecting member 31 pivotally mounted in the mirror box 2, located directly before a photographic plane when the instant-return mirror 3 is set at the lower position (shown) and removed from the optical path of the photographic lens when the instant-return mirror 3 is set at the upper position; the field stop 6 disposed on the reflecting member 31; the film plane 5 arranged, behind the reflecting member 31, on the rear face of the mirror box 2; the condenser lens 7 arranged adjacent to the reflecting member 31; the separator stop 9 arranged on the optical path of light transmitted through the photographic lens 1 and instant-return mirror 3, traveling in the order of the condenser lens 7, reflecting member 31, and condenser lens 7, and reflected from the instant-return mirror 31, having a pair of apertures juxtaposed normal to the plane of the figure at an interval that focus accuracy can be secured; a pair of separator lens units (reimaging lenses) 26 juxtaposed normal to the plane of the figure, behind the pair of aperture of the separator stop 9; the light-receiving element 11 arranged at the imaging position brought about by the separator lens units 26; the focusing screen 12 arranged on the optical path of light transmitted through the photographic lens 1 and reflected from the instant-return mirror 3, at a plane equivalent optically to the film plane 5; the condenser lens 13 disposed in front of the focusing screen 12; the field stop 14 disposed at the same position as the focusing screen 12; the pentagonal prism 15 whose entrance surface is positioned in rear of the focusing screen 12; and the eyepiece 16 arranged behind the exit surface of the pentagonal prism 15. Of these components, the photographic lens 1 and film plane 5 constitute a photographing optical system. Further, the instant-return mirror 3, condenser lens 7, reflecting member 31, separator stop 9 with a pair of apertures, separator lens units 26 in a pair, and light-receiving element 11 constitute a focus detecting optical system on a phase correlation scheme of performing the focus detection by making use of beams of light traversing the different areas of the photographic lens 1 to detect the relative positional relationship of a pair of images of an object. Also, the instant-return mirror 3, condenser lens 13, focusing screen 12, field stop 14, pentagonal prism 15, and eyepiece 16 constitute a finder optical system. FIG. 7 illustrates an example of the system that the instant-return mirror 3, condenser lens 7, reflecting member 31, and field stop 6 are removed from the optical path of the photographic lens 1 on photographing.

The first embodiment is constructed as mentioned above. Thus, in the finder optical system, a primary imaging plane is independent of the focus detecting optical system, so that a diffuser, a split image prism, or a microprism can be disposed at the primary imaging plane and focusing through the eye can be performed without providing a secondary imaging plane. Additionally, the pentagonal prism 15 like the conventional manner can be employed, with the resultant compaction of the finder optical system.

In the focus detecting optical system, on the other hand, the primary imaging plane is disposed adjacent to the photographic plane in the mirror box 2, so that even though the focus detector assemblies of the picture plane extends in the directions of its major and minor sides, the mirror box 2 does away with the need for an increase in size. Further, since the optical path of the focus detecting optical system is bent by the instant-return mirror 3, the mirror box 2 can be constructed without an increase in size. Besides, the mirror box 2 contains the condenser lens 7 which has been placed in the past outside the mirror box 2 and an optical path from the condenser lens 7 to the separator stop 9 of the focus detecting optical system, with the result that the volume required can be diminished only by the focus detecting optical system.

Hence, the first embodiment is equipped with a focus detecting apparatus in which focusing can be made at any position of the focus detector assemblies extending in the directions of the major and minor sides of the picture plane to be photographed and at the same time, enables the camera body to be compactly designed.

Figure 8:
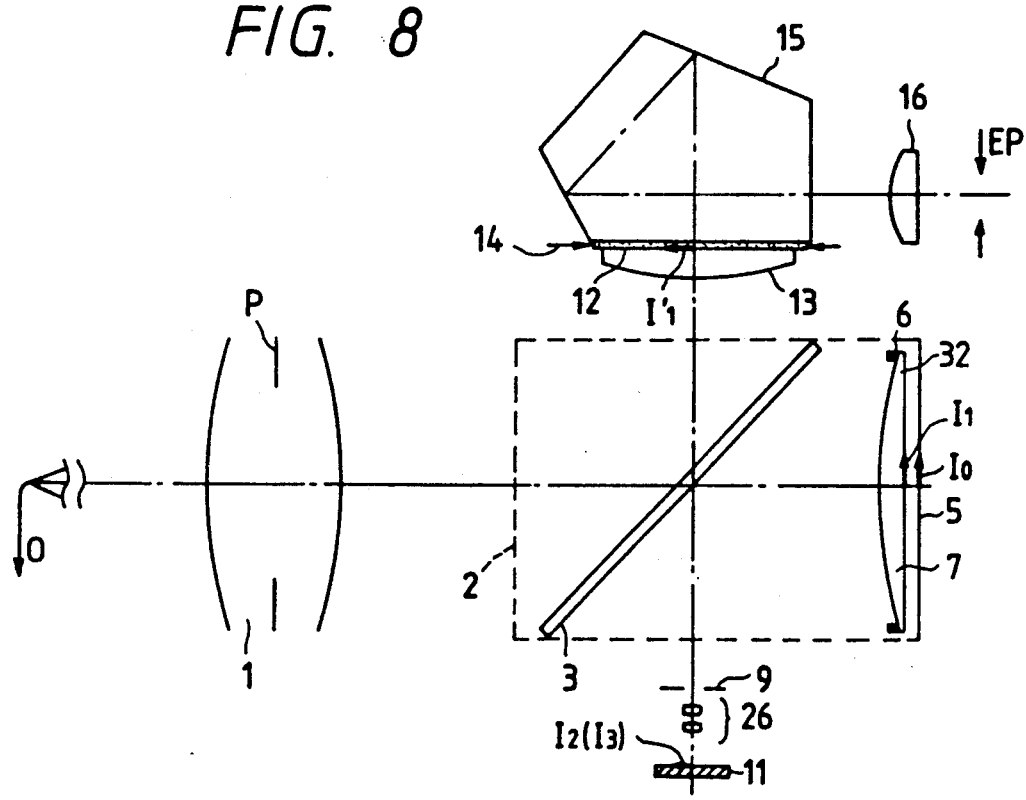
FIG. 8 is a view showing the optical system of a second embodiment.

FIG. 8 shows the optical system of a second embodiment, which makes use of a positive lens 32 provided with both the functions of the reflecting member 31 and the condenser lens 7 in the first embodiment, having a reflecting surface on the side of the film plane 5. In this case, the reflecting surface need not necessarily be planar.

Figure 9:
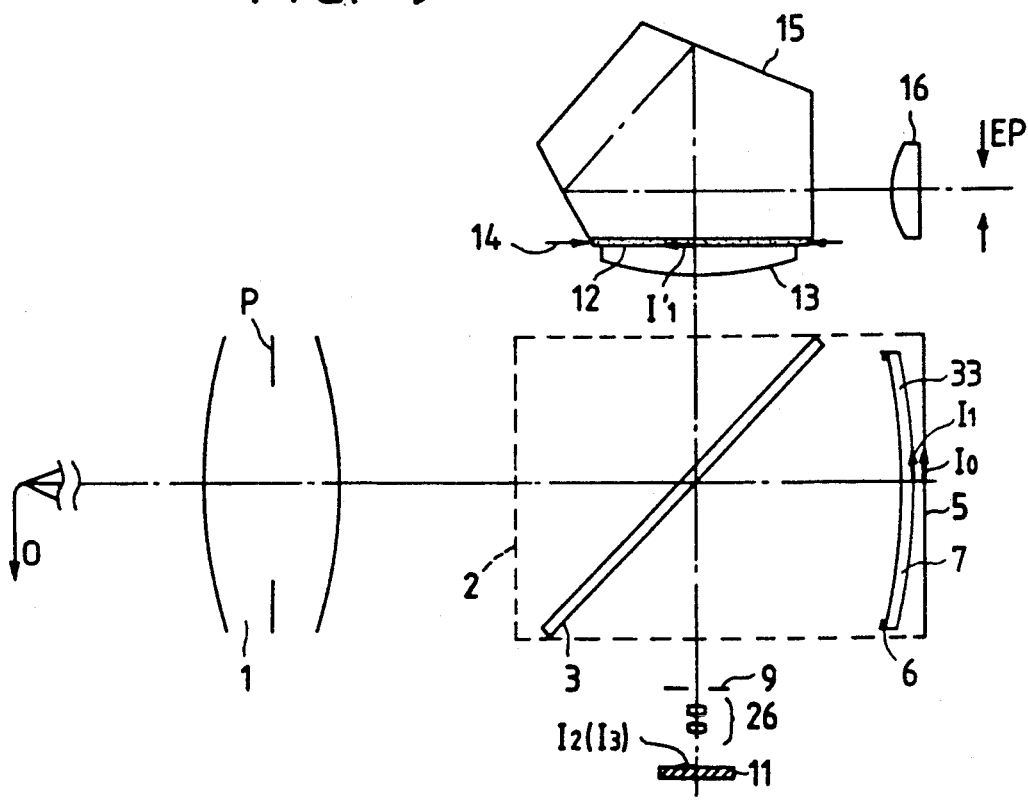
FIG. 9 is a view showing the optical system of a third embodiment.

FIG. 9 depicts the optical system of a third embodiment, which makes use of a concave mirror 33 provided with both the functions of the reflecting member 31 and the condenser lens 7.

Figure 10:
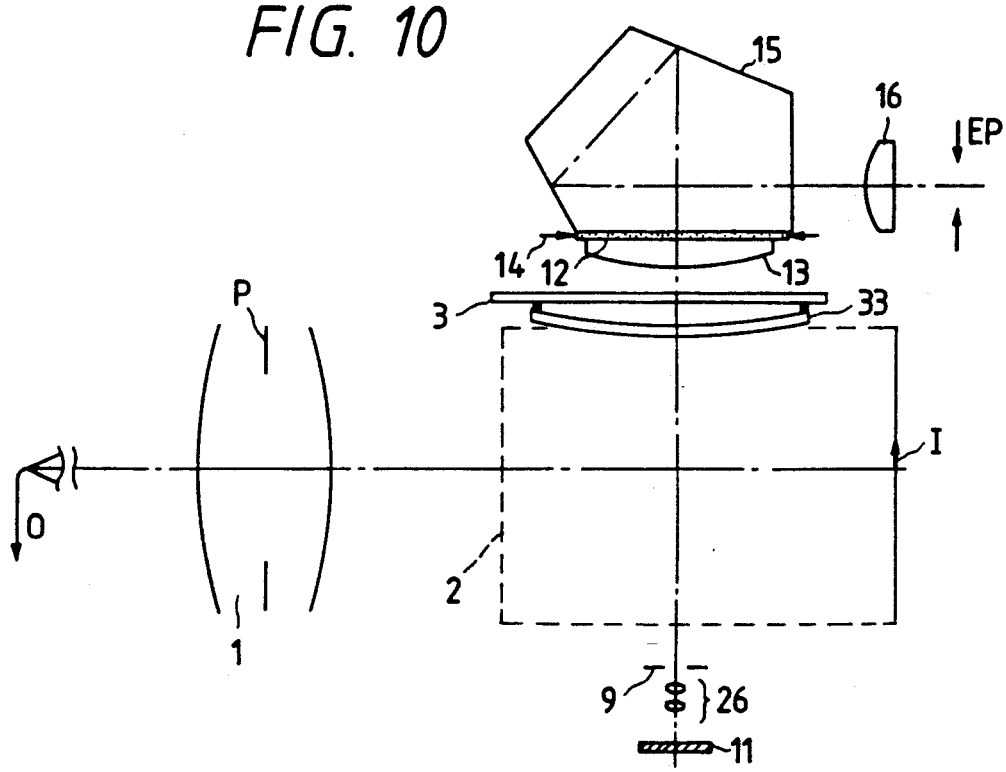
FIG. 10 is a view showing the state where the instant-return mirror and others are removed from the optical path of the photographic lens on photographing in the third embodiment.

FIG. 10 shows the system that the instant-return mirror 3 and the concave mirror 33 in the third embodiment are removed from the optical path of the photographic lens 1 on photographing. This removing system is also effective for the other embodiments.

Also, in each of the embodiments mentioned above, the swing-up type mirror like the so-called instant-return mirror has been adopted as the removing system for the instant-return mirror 3, condenser lens 7, and reflecting member 31 on photographing. As an alternative measure, however, provision may be made for a system such that they are removed outside the mirror box 2 by means of a slide or such that they are conducted onto the lower face of the mirror box 2 by forming arcuate guide grooves in the walls on both sides of the mirror box 2 to guide them along the grooves. The removing position may well be both sides of the mirror box 2 in addition to the upper and lower faces thereof as mentioned above.

Further, in each embodiment, the reflecting angle of the optical axis of the photographic lens 1 need not necessarily be 0°. The instant-return mirror 3 which is a half mirror has a transparent portion with some degree of thickness and, according to which of the upper and lower surfaces thereof is set to the reflecting surface, the optical path of either the finder or focus detecting optical system traverses the transparent portion to deteriorate aberration, so that it is necessary to select the reflecting surface to be set according to which aberration of both optical systems is diminished.

Although each embodiment is such that the separator stop 9 with a pair of apertures and the pair of separator lens units 26 arranged behind the pair of apertures of the separator stop 9 are juxtaposed perpendicular to the plane of the figure, the pair of separator lens units 26 need not necessarily be juxtaposed perpendicular to the plane of the figure if it is arranged perpendicular to the optical axis of the photographic lens 1 which is bent by the instant-return mirror 3 and enters the focus detecting optical system.

Also, although in any of the embodiments the phase correlation scheme is shown as the focus detecting optical system, a contrast method may well be used. In addition, a focus detecting optical system using a so-called hill-climbing scheme is available. In this scheme, focusing is performed by detecting the contrast of an image formed by a photographing optical system and moving the photographing optical system to a position where the contrast is maximum.

What is claimed is:

1. A camera having a photographing optical system including a photographic lens and a film plane, a focus detecting optical system, and a finder optical system, comprising:
    a swing-up type instant-return mirror composed of a half mirror, pivotally mounted in a mirror box;
    a reflecting member mounted in said mirror box, located directly before said film plane when said instant-return mirror is placed on an optical path of said photographic lens and removed from the optical path of said photographic lens when said instant-return mirror is removed from the optical path;
    a field stop disposed on said reflecting member; and
    a condenser lens arranged adjacent to said reflecting member,
    so that when said instant-return mirror is placed on the optical path of said photographic lens, part of beams of light is reflected from said instant-return mirror and incident on the finder optical system, while the remainder is transmitted through the instant-return mirror, reflected from said reflecting member, further reflected from said instant-return mirror, and incident on the focus detecting optical system.

2. The camera according to claim 1, wherein said focus detecting optical system makes use of a phase correlation scheme of detecting a relative positional relationship of at least one pair of images of an object.

3. The camera according to claim 1, wherein said focus detecting optical system makes use of a contrast method for performing a correlative calculation from a contrast of at least one pair of images of an object.

4. A camera having a photographing optical system including a photographic lens and a film plane, a focus detecting optical system, and a finder optical system, comprising:
    a swing-up type instant-return mirror including a half mirror, said swing-up type instant-return mirror being pivotally mounted in a mirror box;
    a reflecting member mounted in said mirror box, disposed directly before said film plane when said instant-return mirror is placed in an optical path of said photographic lens and removed from the optical path of said photographic lens when said instant-return mirror is removed from the optical path;
    a field stop disposed on said reflecting member; and
    a condenser lens cemented to said reflecting member on a side thereof opposite from said film plane;
    wherein when said instant-return mirror is disposed in the optical path of said photographic lens, a part of beam of light is reflected from said instant-return mirror and incident on the finder optical system, while a remaining part is transmitted through the instant-return mirror, reflected from said reflecting member, further reflected from said instant-return mirror, and incident on the focus detecting optical system.

5. The camera as claimed in claim 4, wherein said condenser lens consists of a positive lens.

* * * * *